United States Patent [19]

Conibear

[11] 3,971,155
[45] July 27, 1976

[54] ACTUATOR FOR ANIMAL TRAP
[76] Inventor: Frank R. Conibear, 2170 Evergreen Place, Victoria, British Columbia, Canada
[22] Filed: Oct. 21, 1974
[21] Appl. No.: 516,580

[52] U.S. Cl. .................................................. 43/90
[51] Int. Cl.² ...................................... A01M 23/26
[58] Field of Search ............... 44/88, 90, 91, 92, 93, 44/94, 95

[56] References Cited
UNITED STATES PATENTS

| | | | |
|---|---|---|---|
| 1,445,203 | 2/1923 | Dewey | 43/92 |
| 2,577,182 | 12/1951 | Clark | 43/90 |
| 3,010,245 | 11/1961 | Conibear | 43/90 |
| 3,816,955 | 6/1974 | Conibear | 43/90 |

FOREIGN PATENTS OR APPLICATIONS

| | | | |
|---|---|---|---|
| 14,468 | 1887 | United Kingdom | 43/93 |

Primary Examiner—Warner H. Camp
Attorney, Agent, or Firm—Larson, Taylor & Hinds

[57] ABSTRACT

An improved actuator for a rotating frame trap wherein the actuator rings are of generally oblong shape, being elongated in the general direction of the respective actuator arms. This construction results in a more effective and versatile trap.

7 Claims, 2 Drawing Figures

ACTUATOR FOR ANIMAL TRAP

BACKGROUND OF THE INVENTION

This invention relates to improvements in the actuator of a rotating frame animal trap. By a rotating frame animal trap is meant a trap which comprises a pair of similar frames which may be of a generally square or rectangular shape or of part-trapezoidal shape, and are made of round wire stock, pivotally connected at adjacent ends for relative rotation on a common axis so as to form by their sides two pairs of co-acting jaws. At least one actuator made of round wire stock, consisting of arms springbiased at one end so that the other ends, if unobstructed, would move away from each other to a distance substantially greater than the length of the frame ends, and having each arm terminating in a generally circular ring, adapted to encircle one set of adjacent ends of the frames, is used to urge the jaws towards, and maintain them in closed position. Such a trap is described in my U.S. Pat. No. 3,010,245, dated Nov. 28, 1961 (square or rectangular shape), or my U.S. Pat. No. 3,760,531, dated Sept. 25, 1973 (part trapeziodal shape). The ends of these rotating frame traps which cooperate with the rings are shaped so that, when the trap is in open, set position, outer portions of each end lie substantially parallel to each other, while the central portions of these ends form a cross with each other between the actuator rings. A suitable release mechanism (for example as described in my U.S. Pat. No. 3,010,245; Lehn, U.S. Pat. No. 2,947,107, dated Aug. 2, 1960; or my U.S. Pat. No. 3,762,094, dated Oct. 2, 1973) maintains the frames in open position when the trap is set, but when the trap is sprung, releases the frames so as to permit, as the result of the action of the actuator rings on the frame end, rapid rotation of the frames through an angle of about 90°, so that the jaws quickly strike and squeeze an animal in the trap to kill it.

A significant drawback of such traps arises from the fact that the clamping force of the trap increases as the trap closes, and reaches a maximum as the actuator rings reach the ends of their runs and bear against the extremities of adjacent ends of the trap frames. When bulky-bodied animals are caught in the trap, their body size may prevent the jaws of the trap from closing enough so that the actuator rings can expand sufficiently about these adjacent ends and thus develop enough leverage and clamping force to quickly kill the animal. It can therefore be seen that the humane efficiency of the trap (i.e. the trap's ability to kill any desired animal passing through it, large or small, so that the animal, when caught by the trap, will be killed as quickly as possible) is adversely affected insofar as bulky animals are concerned.

One solution to this problem is to use actuator rings of greater diameter. When a bulky-bodied animal is caught in the trap, even though the jaws do not close completely, the actuator rings could still expand to fully expanded position about adjacent frame ends. However, the initial speed of closing of the trap is sacrificed when such larger rings are used. In addition because of the enlarged rings, there is increased likelihood that the rings in fully expanded position will not bear against adjacent frame ends to urge them closed and thereby exert sufficient clamping force on the jaws of the trap. This would be particularly true when a slim-bodied or small animal was caught in the trap. In such a case, the clamping force might well be insufficient to kill the animal or, in some cases, even to prevent the trapped animal from struggling free of the trap.

In my U.S. Pat. No. 3,760,531, I described a construction of trap frame requiring a downwardly pointing, wedge-shaped space between at least the upper portions of the jaws of the trap when they were in tightly closed position so that the jaws might have a Y appearance, when viewed from the side. This wedge-shaped space was designed to permit the use of such enlarged actuator rings which would expand to fully expanded position about their adjacent frame ends even when bulky animals were caught, and at the same time ensure that sufficient clamping force was generated by the rings in this position. Such bulky animals would normally be caught higher up in the trap so that the wedge-shaped space would engage some of the animal's bulk without preventing further closing of the jaws of the trap. The difficulty here is that when an animal with a bulky body and short legs, for instance, a beaver, is caught in such a trap, the wedge-shaped space may be located too high in the jaws of the trap to be effective. As well, if an animal having a long slender body, such as an otter, is caught in this wedge-shaped space in the upper portions of the trap, then the trap may not kill the animal, but may simply hold the animal until the animal dies in pain or from starvation.

It is an object of the present invention to provide an improved actuator for rotating frame animal traps, which will increase their humane efficiency. It is a further object of the invention to provide an economical improvement which can be made to a given rotating frame animal trap which will result in a greater variety of animals being killed instantly by the trap, or which will result in the death or unconsciousness of a greater variety of animals within a shorter period of time, thereby increasing the trap's versatility in that one size of trap can be used more effectively and humanely to trap animals of different sizes and shapes.

SUMMARY OF THE INVENTION

In order to achieve these and other objects, the actuator is constructed so that the rings at the ends of the arms are of oblong shape, i.e. so that the area circumscribed by each of these rings is of generally oblong shape. The ring is elongated in the general direction of the actuator arms. The oblong shape can be in various forms, such as oval-shaped, diamond-shaped or elliptical. In one embodiment of the actuator according to this invention, to be subsequently described and illustrated the actuator rings are of generally elliptical shape.

In operation, the actuator according to the present invention partly owes its effectiveness to the above-mentioned fact that, because of leverage principles, maximum clamping forces are not developed by the jaws of the rotating frame trap until the actuator rings are approaching the end portions of the adjacent pairs of frame ends about which they expand. The farther along the end members, away from the axis these rings are, the more power or leverage the actuator exerts on the jaws of the trap. Until the trap is half closed, as it is closing about an animal sought to be trapped, little resistance is met and there is little need for the considerable forces subsequently developed. When the jaws meet with resistance from the animal's body, normally shortly after the rings have passed the half-way point of their run along adjacent frame ends, the rings bearing against the adjacent frame ends still have not sufficient leverage to produce much clamping force on the jaws of the trap. Conventional rings, when bulky-bodied animals are caught, are often prevented from expanding further along adjacent frame ends. When a bulky-bodied animal is caught in the trap having an actuator with oblong or elliptical rings according to the present invention, the actuator becomes oriented sideways so that the rings bear upon adjacent frame ends along or near to their major axes. In this way, even though the jaws of the trap may be prevented from closing completely, there is sufficient space provided for the adjacent frame ends along the major axis within each of the actuator rings so that the rings can continue to a more fully expanded position encircling these adjacent frame ends. Consequently, much greater leverage and clamping force on the animal can be developed than would be the case with a conventional actuator.

In addition, as will be explained in more detail subsequently, where a thin-bodied animal is trapped and the actuator is in this sideways position, these rings travel over adjacent members with an increasing slant which in effect reduces the space in the ring provided along this major axis for the outer portions of the adjacent frame ends. In this way, and with proper design of the improved actuator, the clamping force of the trap on a slim-bodied animal is similar to that which is acheived by a conventional actuator. Also, impact strength on such a slim-bodied animal is increased where the actuator is in other than a sideways orientation of 90° to the axis of rotation since the actuator will be thrust towards the trap as the rings reach their final position, urging adjacent frame ends into the more restricted spaces of the rings near the arms of the actuator, thereby increasing the squeeze of the rings on the adjacent frame ends. Thus, a much more versatile trap, effective on both slim and bulky-bodied animals, is provided according to the present invention.

Moreover, when the actuator is in compressed position in the open, set trap, because of the position of its arms, its spring will tend to urge the actuator away from the adjacent frame ends so that these frame ends will be positioned in the more restricted spaces of the rings opposite from the arms. In this way, since the rings will tend to bear against adjacent frame ends at points closer to the minor axis, the frames of the trap will be under less tension in this open, set position, assisting in the firing of the release mechanism.

Of course, by providing in one of the actuator rings the quick-release opening as described in my U.S. Pat. No. 3,816,955, this will contribute to the increased safety of this actuator.

As well, by providing the actuator rings with a slight outward bend, as described and illustrated in my co-pending U.S. application Ser. No. 498,239, greater clamping force can be achieved on the jaws of the trap when the actuator is in fully expanded position not only because the actuator may be more compressed in many positions, but also because such a bend will tend to reduce still further the space provided then for the adjacent frame ends along the major axis.

The actuator according to the present invention, when used in combination with an animal trap of the frame construction described in my co-pending U.S. application Ser. No. 501,755, results in an extremely effective trap. In such a trap, in which outer portions of the frame ends lie on each side of the central portions about which the frames pivot, and in which the jaw-forming sides of each of the frames lie in a common plane, an outer portion of at least one of the ends of a frame encircled by the actuator rings, as it progresses radially outwardly from the axis of rotation of the frames, extends to a point out of the common plane of the frame on the side thereof remote from the other frame when viewed with the trap in closed position, and thence returns to said plane wherein it connects with one end of the jaw. In a preferred embodiment of such a trap, at least one of the outer portions of the adjacent frame ends encircled by the rings on each side of the common axis is so shaped. The point or points to which the outer portion or portions extend may be located at about the same distance from the axis of rotation of the frames as the ends of the jaws to which they connect, or alternatively they may be located at a distance farther from said axis than are said ends of the jaw. Traps of this general construction used with conventional actuators having round rings are extremely effective for catching animals with slim or small bodies. However, when a larger or bulkier animal has been caught in such a trap, the actuator rings have often been unable to expand sufficiently along adjacent pairs of frame ends, to develop sufficient clamping force to effectively and humanely kill the animal. When an actuator according to the present invention is used in combination with such frames, and such a bulky-bodied animal is caught, the actuator rings can thus expand to a significantly greater distance along these adjacent pairs of frame ends, by taking advantage of the space within the rings along their major axes. Thus, additional clamping force is developed, making the trap having such a frame considerably more effective for such animals.

The actuator according to the present invention also operates extremely effectively on a frame constructed as described in my co-pending U.S. application Ser. No. 498,239. Here, the central crossing portions of each of the frame ends about which the actuator rings are normally engaged, are of a greater distance than normal, i.e. these frame ends have a wider "off-set" than is found normally on such traps.

In addition, a slight outward bend at the ends of the frame ends of the trap, when in open set position, may be provided. With such a frame construction, there is some loss of starting power in the trap immediately after it is fired, where it is not so important, yet greater impact strength in the jaws as the actuator rings close over the end portions of the frame ends, which offer less resistance to the rings because of the slight outward bends.

BRIEF DESCRIPTION OF THE DRAWINGS

Other objects and advantages of the invention will become apparent upon reading the following detailed description and upon reference to the drawings in which.

While the invention will be described in connection with example embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Figure 1:
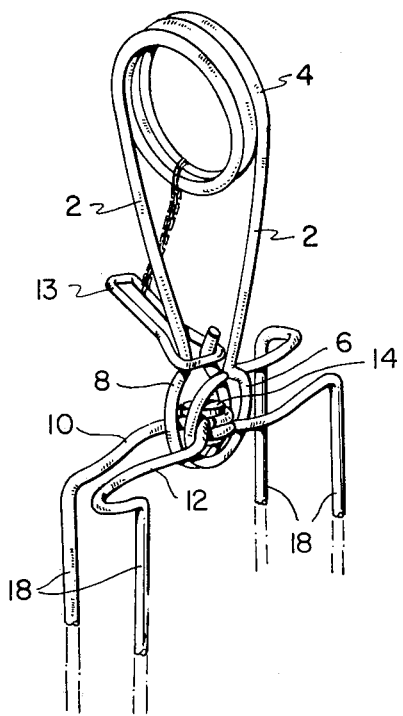
FIGS. 1 and 2 are perspective views of an actuator according to the present invention shown on the upper portion of a rotating frame trap of a construction as described in my co-pending U.S. application Ser. No. 501,755, in open, set position and in closed position respectively.
Figure 2:
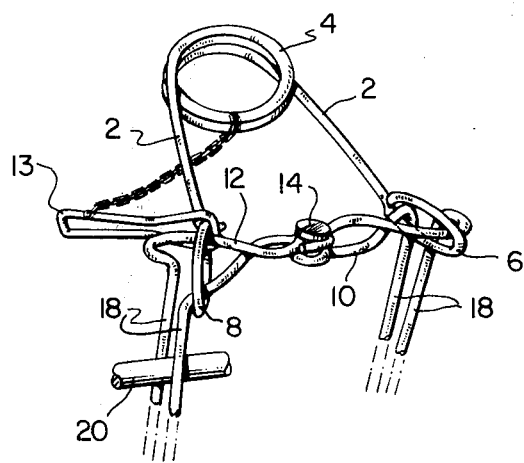

Turning now to the drawings, in which similar features have been given similar reference numerals, there are shown in FIGS. 1 and 2 actuator arms 2 spring biased at one end by coil spring 4 and forming, at their other ends, oblong rings 6 and 8 which encircle adjacent frame ends 10 and 12, said adjacent frame ends connected at pivot 14. In these drawings, the actuator rings happen to be illustrated as encircling frame ends constructed in accordance with my U.S. application Ser. No. 501,755. Actuator ring 8 is constructed with a quick-release opening in accordance with my U.S. Pat. No. 3,816,955, and may have a keeper 13 across this opening to prevent unpurposeful disengagement of this actuator ring from operative position encircling adjacent frame ends.

Actuator rings 6 and 8 are of generally elliptical shape, the major axis of each lying generally in the direction of the corresponding actuator arm 2. Arms 2, near where they join rings 6, are shown as each having a slight outward bend. In FIG. 2, jaws 18 have closed about object 20.

An open, set trap as illustrated in FIG. 1, with the actuator tending to be positioned approximately vertically above the frames along the axis of rotation thereof, ensures that the force exerted on the set trap is not too great for smooth operation of the release mechanism and assists in achieving an extremely rapid initial speed of closing of the trap, since the rings bear against adjacent frame ends relatively close to the axis of rotation.

As soon as the trap is sprung, with the actuator oriented as illustrated in FIG. 1, the actuator pivots from this generally vertical orientation to a sideways orientation, i.e. one in which it is more or less at right angles or an acute angle to the axis of rotation (as in FIG. 2), because of the great force exerted by spring 4 on the actuator rings as they expand, and the small frictional forces involved as a result of the round wire stock used for the frame and actuator. The actuator continues in this orientation until the end of its run. Thus, very soon after the trap is fired, until the trap is closed each of the rings normally bears against adjacent end members along or near to the opposite ends of the major axis of each of the rings.

As the actuator rings expand to closed postion while the trap is closing about a bulky-bodied animal, the greater distance along the major axis of the elliptical space inside each of the actuator rings permits the rings to continue expanding until they act with sufficient leverage on the frame ends to quickly and humanely kill the animal.

Frames as illustrated in FIGS. 1 and 2, described in my co-pending U.S. application Ser. No. 501,755, which are extremely effective for catching smaller animals, are thereby made much more effective for trapping animals with larger or bulkier bodies.

To understand fully one aspect of the operation and some of the advantages of the actuator according to this invention, it should be noted that, as the rings of the actuator expand about adjacent frame ends of the trap, they are in fact pivoting with respect to the actuator spring and in opposite directions. As the rings travel along adjacent frame ends from set position on the open trap to expanded position on the closed trap, they do so with an increasing slant, i.e. the angle between the planes of these rings increases, the slant increasing at a progressively increasing rate. In set position, these planes would normally be almost parallel to each other and in fully expanded position about adjacent frame ends, the planes might happen to be at a 20° angle to each other. Of course, the acuteness of this final angle, when the rings are in expanded position is governed, inter alia, by the length of the actuator arms.

With the actuator rings according to the present invention being elongated in the general direction of the respective arms of the actuator, and oriented sideways as shown in FIG. 2, it can be appreciated that as this slant increases, the space or opening in each of these rings, taken in the direction of the line between co-operating points on co-acting jaws, diminishes. Thus, as the slant of the rings increases towards the end of the run of the rings, the rings provide the adjacent frame ends with increasingly limited space for "play" in the direction of this line between co-operating points on co-acting jaws. Consequently, even when a thin-bodied animal is caught in a trap having conventional square or rectangular frames, the jaws of the closed trap are clamped tightly about the animal's body, despite the fact that rings are still acting along their major axes, thereby provide sufficient clamping force to kill the animal quickly and humanely.

Yet another factor contributing to the increased clamping force produced by an actuator according to the present invention lies in the V-shape of the actuator arms when the actuator rings have expanded almost to fully expanded position about adjacent frame ends. As the actuator rings arrive at this position, this V or wedge-shape of the actuator arms and the force of the spring act to thrust the actuator towards the trap frame. Where the actuator rings are not acting on the frame ends precisely along their major axes, this thrust forces the outer portions of adjacent frame ends towards the narrow space at the upper end of the oblong rings. In this way, the actuator rings acting on end portions of adjacent frame ends are able to produce increased impact strength and clamping force in the jaws of the trap.

Suitable dimensions for the oblong actuator rings according to this invention vary. However, as an example, for approximately 5 inch square frames, the rings might have a three-fourths inch minor axis of the area circumscribed by the rings and a 1¼ inch major axis. Such a trap would be constructed with, for example, 3/16 inch diameter steel wire.

The actuator with oblong rings according to the present invention will improve the humane efficiency of most rotating frame animal traps, including those having frames as described and illustrated in my U.S. Pat. No. 3,010,245, and my co-pending U.S. application Ser. No. 501,755. In addition, many of the other features, not heretofore mentioned, described and illustrated in my previous patents and co-pending applications, such as the double ring actuator feature of my co-pending U.S. application Ser. No. 498,239, or the improved trigger system described and illustrated in my co-pending U.S. application Ser. No. 479,082, may be usefully combined in a trap having an actuator according to the present invention. Such an actuator, when used in combination with such features in a rotating frame trap, results in an extremely efficient trap from the viewpoint of a trapper anxious to increase his catch, as well as from the standpoint of humane efficiency of the trap. The increased clamping force produced by this invention, for a particular size or shape of trap, operating for a greater variety of shapes and sizes of animals, will assist greatly in reducing the enormous and useless waste of wild-life from "wring-offs", i.e. where an animal is able to free itself from the trap, but is mortally injured or permenently disabled, and at the same time give such animals a more humane and merciful death. As well, it will reduce considerably the length of time, as well as pain and misery, for many animals trapped in rotating frame traps, where such animals had previously been simply held by the trap, there having been insufficient clamping force to bring a quick and merciful death to the animal. In such cases, the animals have suffered pain and misery over a long period of time, and died slowly from starvation.

It will be understood that by varying the length of the actuator arms and the longitudinal and lateral dimensions of the oblong area encircled by the actuator rings according to the present invention, the actuator can be designed for a given trap for optimum effectiveness with respect to a given class or range of sizes of animals. Similarly, depending upon the distance out of the common plane of the point or points to which the outer portion or portions of the frame ends extend, where a trap frame according to my co-pending U.S. application Ser. No. 501,755 is used, the clamping force normally exerted by the closed trap on a given type or variety of animals can be predetermined. Thus, the versatility of design of the trap according to the present invention can be readily appreciated.

It is therefore apparent that there has been provided, in accordance with the invention, an improved actuator for a rotating frame animal trap that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. In an animal trap of the type having two similar first and second frames made of round wire stock, each having sides serving as jaws and ends extending therebetween, and which are pivotally connected through adjacent ends for relative rotation between set and closed positions about a common axis, trigger means for releasably maintaining the trap in set position and an actuator made of round wire stock, capable of rapidly and forcefully effecting such rotation upon release of the trigger, having two arms spring-biased at one end so that the other end, if unobstructed, would move to a distance substantially greater than the length of said frame ends, each arm terminating in a ring respectively adapted to encircle adjacent ends of both frames on opposite sides of said axis, an improved actuator wherein each actuator ring is of a regular oblong shape symmetrical about the major axis and the minor axis, the major axis being in the general direction of the respective actuator arm and having a length of a ratio of about 5:3 to the length of the minor axis.

2. Apparatus according to claim 1 wherein said actuator rings are elliptical.

3. Apparatus according to claim 2 in which one of said actuator rings has an opening, the width and positioning of such opening being such that, when the actuator, in sprung condition with its rings encircling adjacent ends of the frames of the trap, is swivelled around the frames of the trap to a predetermined position (not normally acheived in either set or closed position or while the trap is closing), the adjacent frame ends encircled by the one ring can readily pass through the opening.

4. Apparatus according to claim 3 further comprising a keeper adapted to be fastened for purposeful disengagement across said opening, whereby said open ring is closed to prevent said adjacent frame ends disposed within said rings from passing through said opening while said keeper is fastened across said opening.

5. Apparatus according to claim 2 wherein said actuator rings are bent slightly outwardly on said actuator arms whereby, when the actuator is in fully expanded position with lower portions of the actuator rings abutting against the inner sides of the jaws, the actuator is more compressed, and whereby the length of the effective minor axis of the actuator rings acting upon adjacent frame ends is reduced.

6. An animal trap of the type having two similar frames made of round wire stock, each having jaw-forming sides which lie in a common plane and ends extending therebetween to support said jaws, said ends each having a central portion in which the frames are pivotally connected through adjacent ends for rotation about a common axis between set and closed positions and outer portions on each side of the central portion extending to said jaws, a trigger means for releasably maintaining the trap in set position and at least one actuator, capable of rapidly and forcefully effecting such rotation, which has two arms spring-biased at one end so that the other ends, which terminate in rings encircling adjacent ends of both frames on opposite sides of said axis, would, if unobstructed, move apart to a distance substantially greater than the length of said frame ends, the improvement comprising, in combination, actuator rings each being of regular oblong shape symmetrical about the major axis and the minor axis, the major axis being in the general direction of the respective actuator arm and having a length substantially greater than the minor axis, one of said actuator rings having an opening, the width and positioning of said opening being such that, when the actuator, in sprung condition with its rings encircling adjacent ends of the frames of the trap, is swivelled around the frames of the trap to predetermined position (not normally achieved in either set or closed position or when the trap is closing), the adjacent frame ends encircled by the one ring can readily pass through the opening, and an outer portion of at least one of said ends of a frame encircled by said rings being so shaped, as it progresses radially outwardly from said axis, that it extends to a point out of the common plane of said jaws on the side thereof remote from the other frame when viewed with the trap in closed position, and thence returns to said plane wherein it connects with one end of a jaw, said point being located at a distance from said common axis that is about the same as or greater than the distance from said axis to said one end of a jaw.

7. An animal trap according to claim 6 wherein at least one of the outer portions of the adjacent frame ends encircled by said rings on each side of the common axis is so shaped.

* * * * *